(12) United States Patent
Sakurai et al.

(10) Patent No.: US 10,946,837 B2
(45) Date of Patent: Mar. 16, 2021

(54) WIPER BLADE RUBBER

(71) Applicant: FUKOKU CO., LTD., Ageo (JP)

(72) Inventors: Masaki Sakurai, Saitama (JP); Hiroaki Ohsako, Saitama (JP); Shuichi Ohtsubo, Saitama (JP); Yasuyuki Okamoto, Saitama (JP)

(73) Assignee: FUKOKU CO., LTD., Saitama (JP)

( * ) Notice: Subject to any disclaimer, the term of this patent is extended or adjusted under 35 U.S.C. 154(b) by 189 days.

(21) Appl. No.: 16/323,743

(22) PCT Filed: Jul. 7, 2017

(86) PCT No.: PCT/JP2017/024898
§ 371 (c)(1),
(2) Date: Feb. 6, 2019

(87) PCT Pub. No.: WO2018/030047
PCT Pub. Date: Feb. 15, 2018

(65) Prior Publication Data
US 2019/0168716 A1 Jun. 6, 2019

(30) Foreign Application Priority Data

Aug. 9, 2016 (JP) .............................. JP2016-156233

(51) Int. Cl.
*B60S 1/38* (2006.01)
*C09D 5/00* (2006.01)
(Continued)

(52) U.S. Cl.
CPC ................ *B60S 1/38* (2013.01); *B60S 1/566* (2013.01); *C08J 7/04* (2013.01); *C08J 7/0427* (2020.01);
(Continued)

(58) Field of Classification Search
CPC .. B60S 1/38; B60S 1/487; B60S 1/566; B60S 2001/3829; B60S 2001/3836;
(Continued)

(56) References Cited

U.S. PATENT DOCUMENTS 4,045,838 A * 9/1977 Porter .................... C08J 7/0427
15/250.48
6,017,582 A * 1/2000 Desormiere ............... C08J 7/06
427/180

(Continued)

FOREIGN PATENT DOCUMENTS

JP 2002020695 A 1/2002
JP 2003253214 A 9/2003
(Continued)

OTHER PUBLICATIONS

International Search Report (ISR) dated Sep. 26, 2017 issued in International Application No. PCT/JP2017/024898.
(Continued)

*Primary Examiner* — Gary K. Graham
(74) *Attorney, Agent, or Firm* — Holtz, Holtz & Volek PC

(57) ABSTRACT

Provided is a wiper blade rubber which exhibits high adhesion to glass surfaces, excellent friction performance and excellent wiping performance, while being free from the occurrence of a bulge (blister) in a coating layer due to bleeding from a rubber substrate or blooming. A wiper blade rubber which has a lip part obtained by forming a coating layer on a rubber substrate by spray coating, and which is characterized in that: the coating layer is composed of a portion (A) that covers the rubber substrate and portions (B) that do not cover the rubber substrate; the portions (B) are a plurality of pores which are uniformly dispersed in the entire area of the coating layer and have diameters of 10 to 40 μm; and the ratio of the total area of portion (A) that covers the rubber substrate to the total area of the portions (B) that do not cover the rubber substrate is from 40:60 to 60:40.

7 Claims, 2 Drawing Sheets

(51) Int. Cl.
*B60S 1/56* (2006.01)
*C09D 201/00* (2006.01)
*C08J 7/12* (2006.01)
*C08J 7/04* (2020.01)
*B60S 1/48* (2006.01)

(52) U.S. Cl.
CPC .............. *C08J 7/123* (2013.01); *C08J 7/126* (2013.01); *C09D 5/00* (2013.01); *C09D 201/00* (2013.01); *B60S 1/487* (2013.01); *B60S 2001/3829* (2013.01); *B60S 2001/3836* (2013.01); *C08J 2307/00* (2013.01); *C08J 2311/00* (2013.01); *C08J 2475/04* (2013.01)

(58) Field of Classification Search
CPC ... C08J 7/0427; C08J 7/04; C08J 7/123; C08J 7/126; C08J 2307/00; C08J 2311/00; Y10T 428/265; Y10T 427/25; C09D 5/00; C09D 2001/00
USPC ........................................ 15/250.48; 428/446
See application file for complete search history.

(56) References Cited

U.S. PATENT DOCUMENTS

| | | |
|---|---|---|
| 2003/0087767 A1 | 5/2003 | Goto et al. |
| 2005/0004295 A1 | 1/2005 | Braun |
| 2016/0272158 A1 | 9/2016 | Okamoto et al. |

FOREIGN PATENT DOCUMENTS

| | | |
|---|---|---|
| JP | 2005508794 A | 4/2005 |
| JP | 2014034599 A | 2/2014 |
| WO | 2015080202 A1 | 6/2015 |

OTHER PUBLICATIONS

Written Opinion dated Sep. 26, 2017 issued in International Application No. PCT/JP2017/024898.

\* cited by examiner (a) Comparative Example 1

(b) Comparative Example 2

(c) Example 1

WIPER BLADE RUBBER

TECHNICAL FIELD

The present invention relates to a wiper blade rubber which attains good contact with a glass surface, exhibits excellent frictional performance and wiping performance, and does not show bulges (blisters) on a coating layer caused by bleeding out or blooming from a rubber base material.

BACKGROUND ART

Usually, wiper blade rubbers are molded into a so-called tandem shape in which two wiper blade rubber base materials are connected together via their tips. Next, a wiper blade rubber coating agent is applied onto both sides of a lip portion of the wiper blade rubber base materials, and is dried or cured to form a coating layer. Thereafter, the lip portion is cut along its midline. Consequently, wiper blade rubbers which have the coating layer on both sides of the lip portion and show the rubber base material exposed at the end face of the lip portion are produced.

The application of the coating agent may be performed by a known method such as spray coating, knife coating, roller coating or dipping. The coating agent is usually applied onto the entire surface of the lip portion of a tandem-shaped wiper blade rubber base material so that the dried or cured coating layer has a predetermined thickness.

The rubber base materials of wiper blade rubbers are made of natural rubber, a synthetic rubber such as styrene butadiene rubber, chloroprene rubber, ethylene-propylene-diene rubber (EPDM) or ethylene propylene rubber, a resin elastomer, or an elastic material based on a blend of these rubbers.

The rubber base materials usually contain additives such as plasticizers, stabilizers, UV absorbers, antistatic agents, flame retardants, fillers such as carbon black, reinforcing agents, colorants, crosslinking agents (vulcanizing agents and vulcanization accelerators), odor masking agents, softening agents and antiaging agents.

Wiper blade rubbers are fitted to the sliding portions of wipers in transport machines such as vehicles, aircrafts and ships, industrial machines and instruments such as construction machines, and are therefore exposed to outdoor environments for a long time. As a result of such exposure, it is unavoidable that a phenomenon called bleed-out occurs in which the additive rises to the surface of the rubber base material. Such a phenomenon is particularly called blooming when the surface of a rubber base material becomes covered with a powder. The occurrence of such phenomena gives rise to bulges (blisters) on the coating layers of wiper blade rubbers. There have been no solutions which are highly effective for solving the above-mentioned quality and aesthetic problems of wiper blade rubbers.

CITATION LIST

Patent Literature

Patent Literature 1: JP 2003-253214 A

SUMMARY OF INVENTION

Technical Problem

An object of the present invention is to provide a wiper blade rubber which attains good contact with a glass surface, exhibits excellent frictional performance and wiping performance, and does not show bulges (blisters) on a coating layer caused by bleeding out or blooming from a rubber base material.

Solution to Problem

The present invention embraces the following.

[1] A wiper blade rubber comprising a rubber base material and a coating layer formed by spray coating on a lip portion of the rubber base material,
wherein the coating layer comprises portion (A) that covers the rubber base material, and portion (B) that does not cover the rubber base material,
wherein portion (B) that does not cover the rubber base material comprises a plurality of pores having a diameter of 10 μm to 40 μm and being uniformly dispersed over an entire area of the coating layer, and
wherein a ratio of a total area of portion (A) that covers the rubber base material, to a total area of portion (B) that does not cover the rubber base material ranges from 40:60 to 60:40.

[2] The wiper blade rubber described in [1], wherein the rubber base material comprises at least one material selected from natural rubber, chloroprene rubber, and mixed materials of natural rubber and chloroprene rubber.

[3] The wiper blade rubber described in [1] or [2], wherein a portion of the rubber base material in contact with the coating layer has been treated by one or two or more of halogenation treatment, UV treatment, electron beam treatment, plasma treatment and corona discharge treatment.

[4] The wiper blade rubber described in any one of [1] to [3], wherein portion (A) that covers the rubber base material comprises a solid lubricant comprising flake graphite with a particle size of 3 μm to 5 μm, and wherein a binder for attaching the solid lubricant to the wiper blade rubber has an elastic modulus (0.5% modulus) of not less than 1 MPa and an elongation at break of not less than 1%.

[5] The wiper blade rubber described in any one of [1] to [4], wherein portion (A) that covers the rubber base material has a thickness of 2 μm to 10 μm.

[6] The wiper blade rubber described in [4], wherein a volume ratio of the solid lubricant to the binder in the coating layer ranges from 0.25 to 1.

Advantageous Effects of Invention

According to this invention, the coating layer may avoid occurrence of bulging (being blistered) by providing the coating layer with pores through which additives that are bleeding out to the surface of the rubber base material may gradually be released. Any adverse effect to the other properties can be avoided by arranging the pores with appropriate size and distribution.

DESCRIPTION OF EMBODIMENTS

1. Wiper Blade Rubber

First, the wiper blade rubber of the present invention will be described.

Figure 1:
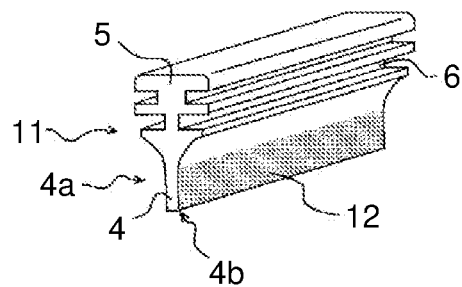
FIG. 1 is a partial perspective view illustrating an embodiment of the wiper blade rubber according to the present invention.

FIG. 1 is a partial perspective view illustrating an embodiment of the wiper blade rubber of the present invention. In FIG. 1, numeral 11 indicates a wiper blade rubber. Wiper blade rubber 11 is composed of lip portion 4 having a lip sliding part 4b that slides in contact with a glass surface, holding part 5 which will be fitted and held to a wiper blade holder (not shown) together with a vertebra (not shown), and neck part 6 which connects lip portion 4 to holding part 5. Numeral 12 indicates a surface-treated part. Surface-treated part 12 is disposed on lip lateral part 4a of lip portion 4 of wiper blade rubber 11. Wiper blade rubber 11 can constitute a satisfactory wiper by being fitted to a wiper device.

2. Materials

Next, the materials that constitute the wiper blade rubber will be described.

Figure 2:
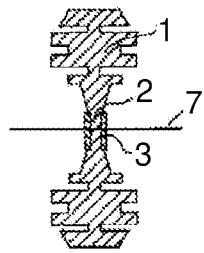
FIG. 2 is a sectional view of a tandem-shaped wiper blade rubber base material.

The wiper blade rubber is typically molded with a tandem shape as illustrated in FIG. 2, in which two wiper blade rubber base materials 1 abut together via their tips. A coating agent containing a predetermined polymer and solid lubricant is applied by spraying to both sides of constricted lip portion 2 of wiper blade rubber base materials 1, and is cured or dried to form coating layer 3 in which the solid lubricant is dispersed. Thereafter, lip portion 2 is cut along the middle (along a cutting part indicated with numeral 7 in FIG. 2). Consequently, wiper blade rubbers are produced which have coating layer 3 on both sides of lip portion 2 and show the rubber base material exposed at the end face of the lip portion.

2.1. Rubber Base Material

Examples of rubbers which can constitute the wiper blade rubber base material include natural rubber, styrene-butadiene rubber, chloroprene rubber, ethylene-propylene-diene rubber (EPDM), ethylene-propylene rubber, and mixtures of these rubbers. Resin elastomers may be used depending on use applications. Natural rubber, chloroprene rubber, and mixtures including these rubbers are preferable.

The shape of the rubber base material is not particularly limited, but preferably has a tandem cross section such as the one described above. Adopting such a shape makes it easy to cut a lip portion with a clean end, and also makes it possible to realize economically efficient production of wiper blade rubbers having, on a lip portion, a coating layer in which solid lubricant is dispersed.

Preferably, the part of the rubber base material that will be the lip portion of the wiper blade rubber (the portion where the rubber base material adheres to the coating layer) is subjected beforehand to a conventional surface treatment, for example, one or two or more of halogenation treatment, UV treatment, electron beam treatment, plasma treatment and corona discharge treatment. A chlorination treatment is one example of a halogenation treatment. In the chlorination treatment, at least the lip portion of the wiper blade rubber is soaked into a chlorine-containing solvent to harden the surface.

At the same time, the chlorination treatment can roughen the surface to enhance the adhesion between the rubber base material and the coating layer.

2.2. Solid Lubricants

The solid lubricant according to the present invention comprises flake graphite. Any known solid lubricants may be used in combination. Examples thereof includes molybdenum disulfide, tungsten disulfide, boron nitride and polytetrafluoroethylene (PTFE).

If the solid lubricant comprising flake graphite has a relatively large particle size, the surface roughness becomes large, the peeling of the flake graphite increases, and the wiping performance of the obtained wiper blade rubber deteriorates. The particle size of the solid lubricant comprising flake graphite, specifically, the volume-based average particle size ($D_{50}$) measured by a laser diffraction scattering method ranges preferably 3 μm to 5 μm. For example, the laser diffraction scattering method may be performed using a device such as microtrack grain size distribution analyzer MT3300 (manufactured by Nikkiso Co., Ltd.). When the solid lubricant is spherical, the average particle size indicates the diameter. In the case where the solid lubricant is flake graphite, the average particle size indicates the length along the major axis.

2.3. Coating Layer

In the present invention, a coating layer is formed on the rubber base material by spray coating, thus forming a lip portion of the wiper blade rubber. The coating layer comprises portion (A) that covers the rubber base material, and portion (B) that does not cover the rubber base material.

Portion (A) that covers the rubber base material preferably has a thickness of 2 μm to 10 μm.

Portion (B) that does not cover the rubber base material comprises a plurality of pores having a diameter of 10 μm to 40 μm and being uniformly dispersed over the entire area of the coating layer. Here, the phrase "uniformly dispersed" refers to the state in which the pores are not markedly concentrated at some specific regions but are present evenly over the entirety of the coating layer (FIG. 4(C)). The pores are not necessarily perfect circles and may be such that the inner wall of the pores is an irregular surface with protruding or recessed flake graphite. In such a case, a longer diameter of the pore surrounded by the inner wall including the protruding flake graphite is taken as the diameter. To ensure slow release of the additives bleeding out from the interior of the rubber base material, it is preferable that the pores penetrate from the close contact surface between the coating layer and the rubber base material to the outer surface of the coating layer.

The ratio of the total area of portion (A) that covers the rubber base material to the total area of portion (B) that does not cover the rubber base material is within the range of from 40:60 to 60:40.

In the coating layer, the volume ratio of the solid lubricant to the binder (hereinafter referred to as the P/B ratio) ranges preferably 0.25 to 1. A volume ratio of the solid lubricant to the binder of less than 0.25 may raise the coefficient of static friction of the wiper blade rubber having a lip portion on which a coating layer is formed, and may sometimes cause skipping of the wiper blade on the glass. To the contrary, when a volume ratio of the solid lubricant to the binder is more than 1.0, blooming occurs at the surface of the coating film of the wiper blade rubber having the lip portion with the coating layer, and the solid lubricant may adhere to the glass surface.

3. Methods for Producing Wiper Blade Rubber

The wiper blade rubber of the present invention may be produced by spray coating the rubber base material with a coating agent to form a coating layer.

3.1. Coating Agent

The coating agent includes a binder and a solid lubricant, and is usually used in such a manner that solid components including the binder and the solid lubricant are dissolved into a solvent.

3.1.1. Binder

As the binder, it is preferable to select one having a modulus of elasticity (0.5% modulus) of the binder after drying or curing of 1 MPa or more and an elongation at break of 1% or more. A binder having an elastic modulus of less than 1 MPa may sometimes fail to impart a sufficiently low frictional coefficient to the resultant wiper blade rubbers. On the other hand, if the elongation at break of the binder is less than 1%, when the coating layer is formed by drying or curing the coating agent applied to the rubber material and the tip of the lip portion is cut, cracking of the coating layer occurs and peeling of the coating layer may occur.

Specific examples of the binders include the following binders a) to g).

a) 100 parts by mass of polyol polyether urethane/aromatic isocyanate ("NIPPOLAN 3016" (trademark; manufactured by Nippon Polyurethane Industry Co., Ltd.)/5 parts by mass of "CORONATE L" (trademark; manufactured by Nippon Polyurethane Industry Co., Ltd., curing agent)).

b) Copolymer of tetrafluoroethylene, hexafluoropropylene and vinylidene fluoride ("THV200P" (trademark) manufactured by Sumitomo 3M Limited).

c) 100 parts by mass of silicon-modified urethane polyol/isophorone diisocyanate ("TAKELAC TE-520" (trademark; manufactured by Takeda Pharmaceutical Company Limited)/33 parts by mass of "TAKENATE D-140N" (trademark; manufactured by Takeda Pharmaceutical Company Limited, curing agent)).

d) 100 parts by mass of BPA-type liquid epoxy/aromatic polyamide ("ADEKA RESIN EP-4100" (trademark; manufactured by ADEKA CORPORATION)/60 parts by mass of "ADEKA HARDENER EH-540" (trademark; manufactured by ADEKA CORPORATION, curing agent)).

e) Polyamidimide ("HPC-5000-37" (trademark; manufactured by Hitachi Chemical Co., Ltd.)).

f) 100 parts by mass of polyol polyether urethane/block isocyanate ("NIPPOLAN 179" (trademark; manufactured by Nippon Polyurethane Industry Co., Ltd.)/124 parts by mass of "CORONATE 2513" (trademark; manufactured by Nippon Polyurethane Industry Co., Ltd., curing agent)).

g) Acrylic polymer ("ACRYDIC 56-1155" (trademark; manufactured by DIC CORPORATION)).

Each of these binders a) to g) was formed into 10 mm wide strip samples having a thickness of 30 to 150 μm. The strip samples were stretched at a stress rate of 10 mm/min to measure stress-strain curves (S-S curves). Their modulus at 0.5% stretching is shown in Table 1 together with the coefficient of static frictions of coating layers of wiper blade rubbers obtained using each of these binders. The coefficient of static friction measuring method will be described later.

TABLE 1

| Binder | Modulus at 0.5% stretching | Coefficient of static friction |
|---|---|---|
| a | 0.02 MPa | 0.96 |
| b | 0.10 MPa | 0.74 |
| c | 0.25 MPa | 0.73 |
| d | 4.58 MPa | 0.60 |
| e | 4.67 MPa | 0.62 |
| f | 5.00 MPa | 0.56 |
| g | 7.22 MPa | 0.58(0.88) |

0.88 for the binder g is the value after film separation.

The greater the 0.5% modulus of the binder after drying or curing, the lower the coefficient of static friction of the coating layer of the wiper blade rubber. Generally, at 1 MPa or more, occurrence of skipping of the wiper blade is suppressed, and the coefficient of friction of the coating layer is 0.65 or less.

Next, the elongation at break (%) of the dried or cured products of the above binders was measured. The relationship between coating layer cracking (coating film peeling) and breaking elongation at the time of cutting the tip of the lip portion after applying a coating agent using various binders, followed by drying or curing was investigated.

Table 2 shows the results. From Table 2, it can be understood that when the elongation at break is about 0.8% or less, the film cracking may occur due to the film thickness and the effect of cutting.

TABLE 2

| Binder | Elongation at break (%) | Cracks |
|---|---|---|
| a | 554 | Absent |
| b | 948 | Absent |
| c | 141 | Absent |
| d | 4.8 | Absent |
| e | 7.0 | Absent |
| f | 3.1 | Absent |
| g | 0.8 | Cracks can occur. |

3.1.2. Solid Lubricant

The details about the solid lubricant are as described hereinabove.

3.1.3. Solvent

The solvent may be any substance without limitation as long as it has a drying rate (volatility) enough to form a uniform coating layer of the coating agent by spray coating.

For example, the solvent may be selected from ketones such as acetone and methyl ethyl ketone; aromatic hydrocarbons such as toluene, xylene and ethylbenzene; amides such as N,N-dimethylacetamide and N,N-dimethylformamide; ethers such as tetrahydrofuran; alcohols such as n-butanol; cellosolve acetate, and mixtures of these solvents. Preferably, the solvent is elected from acetone, methyl ethyl ketone, toluene, xylene, ethylbenzene, dimethylformamide-one, and a mixture thereof.

3.1.4. Preparation of Coating Agent

For example, the coating agent may be prepared as follows. A predetermined organic solvent is put in a container, and a binder is mixed therewith and dissolved therein using a stirrer. Further, a solid lubricant such as flake graphite is added little by little, and the coating agent is obtained by stirring until uniformly large particles disappear. In the case of using a curing agent, a predetermined amount of a curing agent is added and sufficiently mixed just before applying the coating agent to the wiper blade.

The amount of the solvent used relative to the solid components is not particularly limited. Usually it is selected within the range of 150 to 1,200 parts by mass per 100 parts by mass of the solid components.

The coating agent is usually adjusted to a kinematic viscosity in which uniform spray coating is possible. Preferably, the kinematic viscosity is controlled to 30 centipoises or below, and more preferably 23 centipoises or below. A coating agent having a kinematic viscosity of 40 centipoises or above may not always be sprayed as a fine mist, and may sometimes form droplets like large snow flakes.

3.2. Spray Coating

The coating agent prepared as described above is sprayed onto both sides of the lip portion in the constricted part of the wiper blade rubber base materials, and is cured or dried to form a coating layer. In this process, the coating agent is sprayed so as to form a coating layer including portion (A) that covers the rubber base material and portion (B) that does not cover the rubber base material. Preferably, the coating agent is sprayed so that portion (A) that covers the rubber base material provides a coating layer thickness of 2 µm to 10 µm. Portion (A) having a coating layer thickness of less than 2 µm may sometimes provide a wiper blade rubber with an undesirably high frictional coefficient relative to glass. To the contrary, portion (A) having a coating layer thickness of higher than 10 µm may sometimes yield a wiper blade rubber with deteriorated wiping performance.

The spray coating is usually performed using a spray gun. The nozzle exit diameter thereof and the pressure used are not particularly limited. As a general guidance, the nozzle exit diameter is within the approximate range of 0.1 to 1.0 mm, and the pressure is controlled within the range of about 0.1 to 10 bar.

EXAMPLES

Hereinbelow, the present invention will be described in detail based on Examples and Comparative Examples. It should not be interpreted that the scope of the invention is limited to such Examples and Comparative Examples. In the Examples and Comparative Examples, "part(s)" and "%" refer to "part(s) by mass" and "% by mass", respectively, unless otherwise indicated.

4. Methods for Measuring the Properties

The properties were measured as described below.

4.1. Wiping Sensory Evaluation

The wiping performance was sensorially evaluated as follows. A wiper blade rubber provided with a coating layer formed with a coating agent was attached to an ordinary automobile wiper device. After that, about 100 to 500 ml of water was evenly sprayed per minute onto the window glass surface of the ordinary automobile, and the wiping operation was performed with a wiper device. The state of streaks remaining on the outer surface of the window glass when the wiper blade rubber wiped the window glass downward was evaluated from the interior of the automobile through the window glass.

Figure 3:
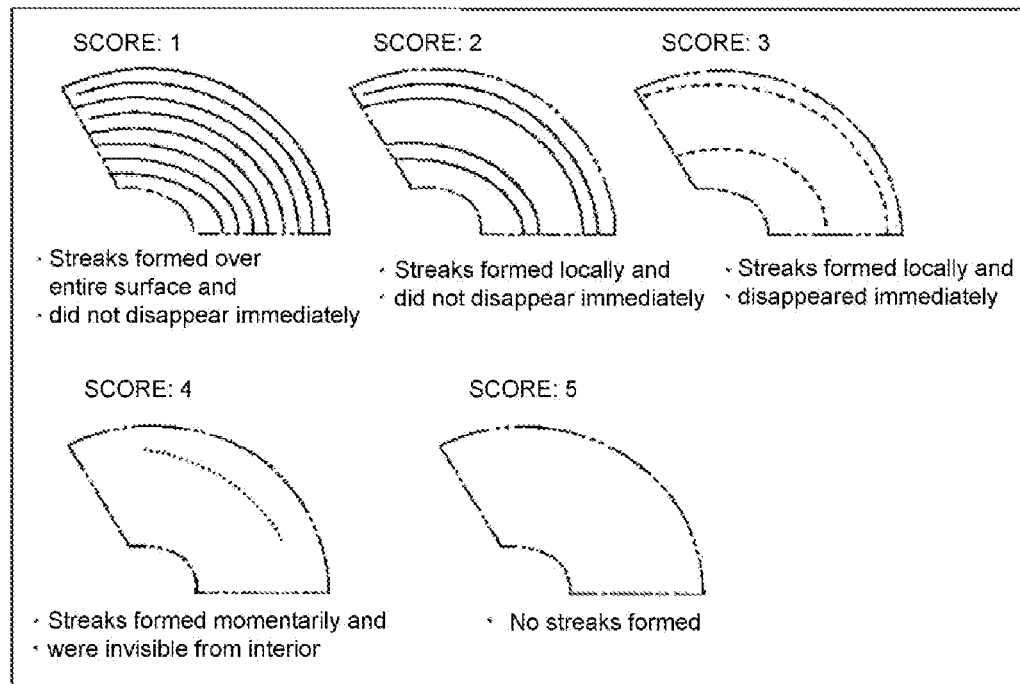
FIG. 3 is a view schematically illustrating the criteria of sensory evaluation scores.

The wiping performance was evaluated based on scoring criteria described later. Prior to the wiping test, the window glass surface was cleaned, and a glass surface from which wax and a coating agent had been removed was made into a normal glass surface. Further, a water repellent glass surface was formed on a glass surface on which a water repellent coating film was formed using a commercially available water repellent for automobile window glass in accordance with the attached instructions. Here, as a water repellent agent, Drive Joy (registered trademark) made by TACTI CORPORATION and a commercial glass coat set (sometimes referred to as "Drive Joy repellent glass coat")

were used. FIG. 3 is a view schematically illustrating the criteria of sensory evaluation scores.

Evaluation score 5: No streaks formed.
Evaluation score 4: Streaks formed momentarily and disappeared immediately.
Evaluation score 3: Streaks formed locally and disappeared immediately.
Evaluation score 2: Streaks formed locally and did not disappear immediately.
Evaluation score 1: Streaks formed over the entire surface and did not disappear immediately.

4.2. Method for Measuring Film Thickness

A coating agent is applied to a SUS plate having a thickness of 50±1 µm under the same conditions as it is applied to a lip portion of a wiper blade rubber.

The thickness of the plate before and after the coating process is measured with a micro gauge, and the difference in thickness is taken as the film thickness.

4.3. Area Coated with Coating Layer

A coating agent is applied to a chlorine-treated rubber base material. The coated face is photographed with a CCD camera (magnification ×200, field of view: 1.5 mm horizontal×1.1 mm vertical). By binarizing the photographed image, the coating layer is represented by white and the rubber base material is represented by black.

The coated area is calculated in percentage using the following formula:

Calculation formula: Area of white/(Area of white+Area of black)×100

Incidentally, the coated area measured may vary ±10%.

Figure 4:
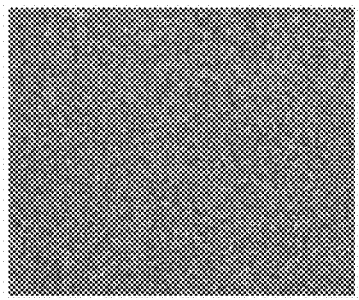
FIG. 4 is a set of micrographs of the surface of coating layers in Comparative Example 1 (micrograph a), Comparative Example 2 (micrograph b) and Example 1 (micrograph c) (magnification ×200, field of view: 1.5 mm horizontal×1.1 mm vertical).
Figure 4:
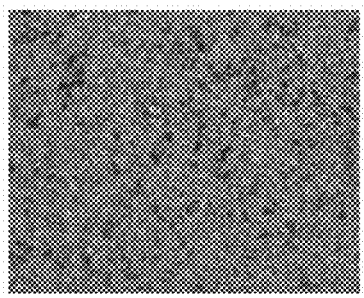
Figure 4:
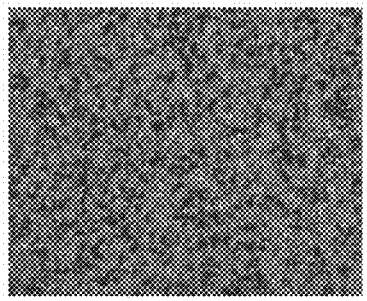

FIG. 4 shows micrographs of the surface of coating layers actually photographed (magnification ×200, field of view: 1.5 mm horizontal×1.1 mm vertical). Micrographs (a), (b) and (c) show the coating layers obtained in Comparative Example 1, Comparative Example 2 and Example 1 described later, respectively, and the coated area was 100%, 70% and 50%, respectively.

4.4. Anti-Skipping Performance

A cut body bench imitating an actual car is provided. The wiper is operated while spraying water. The voltage to the motor is decreased step by step by 1 V, and the minimum voltage which does not cause skipping vibrations is recorded.

4.5. Coefficient of Static Friction

The coefficient of static friction was determined in the following manner. A wiper blade rubber sample having a length of 10 cm was pressed against a glass surface under a pressure P of 1.67 N (170 gf). The relative velocity between the glass surface and the wiper blade rubber sample was changed in the range of 0 to 2 m/s. The load F of the sample on the glass surface was measured with a strain gauge. The surrounding temperature during the measurement was room temperature. The coefficient of static friction was calculated from $\mu$=P/F using the values measured as described above.

4.6. Durability Test

A cut body bench imitating an actual car was provided. A wiper was operated 100,000 times, and the wiping performance was evaluated in the same manner as described in the wiping sensory evaluation.

4.7. Bulges (Blisters) on Coating Layer

Wiper blade rubbers were allowed to stand outdoors for 2 weeks, and the coating layers on the lip portions are visually inspected for bulges.

Example 1

A tandem-shaped body was molded as illustrated in FIG. 2 which was a unit of two pieces of wiper blade rubber (material: a blend of natural rubber and chloroprene rubber).

The tandem-shaped body was soaked in a treatment liquid to chlorinate the surface, and was cleaned in boiling water. Next, a coating agent was applied to one side mainly over a lip portion with a spray gun. The wiper blade rubber was reversed and the coating agent was applied to the other side. The coating agent was then cured in a calcining furnace. Thereafter, the rubber base material was cut along the center of the lip portion to give two pieces of wiper blade rubber. The area coated with the coating layer was 50% (the exposed rubber area was 50%), the coating layer thickness was 6 μm, and the diameter of the coated portions was 25 μm.

The coating agent was prepared by taking 8.0% by mass of flake graphite (product name "UF-2" manufactured by SKW East Asia Limited) as a solid lubricant and 11.0% by mass of polyol polyether urethane/block isocyanate (including 100 parts by mass of "NIPPOLAN 179" (product name) and 15 parts by mass of "CORONATE 2513" (product name), both manufactured by Nippon Polyurethane Industry Co., Ltd.), as a binder, so as to adjust the P/B ratio (the volume ratio of the solid lubricant to the binder) to 0.5; placing these materials into a container together with a solvent consisting of 56.0% by mass of methyl ethyl ketone, 15.0% by mass of xylene and 10.0% by mass of N,N-dimethylformamide; and stirring the mixture to uniformity. The elastic modulus (0.5% modulus) and elongation at break of the binder were 5 MPa and 3.1%, respectively.

Examples 2 and 3

Wiper blade rubbers were obtained by repeating the procedure described in Example 1, except that the rubber base material was changed to natural rubber or chloroprene rubber, respectively.

Example 4

Wiper blade rubbers were obtained by repeating the procedure described in Example 1, except that the particle size of the flake graphite was changed to 5 μm.

Examples 5 and 6

Wiper blade rubbers were obtained by repeating the procedure described in Example 1, except that the P/B ratio was changed to 0.25 or 1, respectively.

Examples 7 and 8

Wiper blade rubbers were obtained by repeating the procedure described in Example 1, except that the thickness of the coating layer was changed to 2 μm or 10 μm, respectively.

Examples 9 and 10

Wiper blade rubbers were obtained by repeating the procedure described in Example 1, except that the diameter of the coated portions was changed to 40 μm or 10 μm, respectively.

Comparative Examples 1 and 2

Wiper blade rubbers were obtained by repeating the procedure described in Example 1, except that the area coated with the coating layer was changed to 100% (the exposed rubber area was 0%) or 70% (the exposed rubber area was 30%).

Comparative Example 3

Wiper blade rubbers were obtained by repeating the procedure described in Example 1, except that the elastic modulus of the binder was changed to 0.5 MPa.

Table 3 shows the results.

TABLE 3

| | Examples | Comp. Ex. 1 | Comp. Ex. 2 | Comp. Ex. 3 | Ex. 1 | Ex. 2 | Ex. 3 |
|---|---|---|---|---|---|---|---|
| Coating layer | Coated area (%) | 100 | 70 | 70 | 50 | 50 | 50 |
| | Exposed rubber area (%) | 0 | 30 | 30 | 50 | 50 | 50 |
| | Diameter (μm) of the coated portions | 0 | 25 | 25 | 25 | 25 | 25 |
| | Rubber base material | Blend | Blend | Blend | Blend | Natural rubber | Chloroprene rubber |
| | Particle size (μm) of flake graphite | 3.5 | 3.5 | 3.5 | 3.5 | 3.5 | 3.5 |
| | P/B ratio (volume ratio) | 0.5 | 0.5 | 0.5 | 0.5 | 0.5 | 0.5 |
| | Thickness | 12 | 6 | 6 | 6 | 6 | 6 |
| Coating agent | Kinematic viscosity | 23 | 23 | 23 | 23 | 23 | 23 |
| | Solvent | Methyl ethyl ketone/ xylene/ dimethyl-formamide mixture | Methyl ethyl ketone/ xylene/ dimethyl-formamide mixture | Methyl ethyl ketone/ xylene/ dimethyl-formamide mixture | Methyl ethyl ketone/ xylene/ dimethyl-formamide mixture | Methyl ethyl ketone/ xylene/ dimethyl-formamide mixture | Methyl ethyl ketone/ xylene/ dimethyl-formamide mixture |
| | Binder elastic modulus (MPa) | 5 | 5 | 0.5 | 5 | 5 | 5 |
| Wiper blade rubber | Wiping performance (scores) | 2.5 | 3.5 | 4.5 | 4.5 | 4.5 | 4.5 |
| | Minimum voltage (V) prior to skipping | 6 | 6 | 7 | 6 | 6 | 6 |
| | Coefficient of static friction (normal glass surface) | 0.2 | 0.23 | 0.26 | 0.23 | 0.23 | 0.25 |
| | Coefficient of static friction (water-repellent glass surface) | 0.49 | 0.61 | 0.7 | 0.58 | 0.58 | 0.61 |
| | Wiping performance after durability test | 4 | 4 | 2.5 | 4 | 4 | 4 |
| | Bulges (blisters) on coating layer | Present | Present | Present | Absent | Absent | Absent |

TABLE 3-continued

| | Examples | Ex. 4 | Ex. 5 | Ex. 6 | Ex. 7 | Ex. 8 | Ex. 9 | Ex. 10 |
|---|---|---|---|---|---|---|---|---|
| Coating layer | Coated area (%) | 50 | 50 | 50 | 50 | 50 | 50 | 50 |
| | Exposed rubber area (%) | 50 | 50 | 50 | 50 | 50 | 50 | 50 |
| | Diameter (μm) of the coated portions | 25 | 25 | 25 | 25 | 25 | 40 | 10 |
| | Rubber base material | Blend | Blend | Blend | Blend | Blend | Blend | Blend |
| | Particle size (μm) of flake graphite | 5 | 3.5 | 3.5 | 3.5 | 3.5 | 3.5 | 3.5 |
| | P/B ratio (volume ratio) | 0.5 | 0.25 | 1 | 0.5 | 0.5 | 0.5 | 0.5 |
| | Thickness | 6 | 6 | 6 | 2 | 10 | 6 | 6 |
| Coating agent | Kinematic viscosity | 23 | 23 | 23 | 23 | 23 | 23 | 23 |
| | Solvent | Methyl ethyl ketone/ xylene/ dimethyl- formamide mixture | Methyl ethyl ketone/ xylene/ dimethyl- formamide mixture | Methyl ethyl ketone/ xylene/ dimethyl- formamide mixture | Methyl ethyl ketone/ xylene/ dimethyl- formamide mixture | Methyl ethyl ketone/ xylene/ dimethyl- formamide mixture | Methyl ethyl ketone/ xylene/ dimethyl- formamide mixture | Methyl ethyl ketone/ xylene/ dimethyl- formamide mixture |
| | Binder elastic modulus (MPa) | 5 | 5 | 5 | 5 | 5 | 5 | 5 |
| Wiper blade rubber | Wiping performance (scores) | 4.5 | 4.5 | 4.5 | 4.5 | 4 | 4.5 | 4.5 |
| | Minimum voltage (V) prior to skipping | 6 | 6 | 6 | 6 | 6 | 6 | 6 |
| | Coefficient of static friction (normal glass surface) | 0.22 | 0.24 | 0.21 | 0.25 | 0.22 | 0.24 | 0.22 |
| | Coefficient of static friction (water-repellent glass surface) | 0.53 | 0.62 | 0.53 | 0.6 | 0.58 | 0.61 | 0.56 |
| | Wiping performance after durability test | 4 | 3.5 | 3.5 | 3 | 4 | 4 | 4 |
| | Bulges (blisters) on coating layer | Absent | Absent | Absent | Absent | Absent | Absent | Absent |

INDUSTRIAL APPLICABILITY

The wiper blade rubbers according to the present invention have pores arranged in the coating layer with appropriate size and distribution, and the pores allow additives bleeding out to the surface of the rubber base material to be gradually released therethrough. Consequently, as shown in Table 3, the coating layer of the wiper blade rubber can be prevented from bulging (being blistered). Thus, the wiper blade rubber of the invention can be prevented from being spoiled in appearance and can maintain a high level of quality.

The invention claimed is:

1. A wiper blade rubber comprising:
a rubber base material including a lip portion; and
a coating layer formed by spray coating on the lip portion,
wherein the coating layer comprises a portion (A) that covers the rubber base material, and a portion (B) that does not cover the rubber base material,
wherein the portion (B) comprises a plurality of pores having a diameter of 10 μm to 40 μm and being uniformly dispersed over an entire area of the coating layer, and
wherein a ratio of a total area of the portion (A) to a total area of the portion (B) is in a range of from 40:60 to 60:40.

2. The wiper blade rubber according to claim 1, wherein the rubber base material comprises at least one material selected from natural rubber, chloroprene rubber, and mixed materials of natural rubber and chloroprene rubber.

3. The wiper blade rubber according to claim 2, wherein a portion of the rubber base material in contact with the coating layer has been treated by at least one of halogenation treatment, UV treatment, electron beam treatment, plasma treatment and corona discharge treatment.

4. The wiper blade rubber according to claim 1, wherein a portion of the rubber base material in contact with the coating layer has been treated by at least one of halogenation treatment, UV treatment, electron beam treatment, plasma treatment and corona discharge treatment.

5. The wiper blade rubber according to claim 1, wherein the portion (A) comprises a solid lubricant comprising flake graphite with a particle size of 3 μm to 5 μm, and
wherein a binder for attaching the solid lubricant to the wiper blade rubber has an elastic modulus (0.5% modulus) of not less than 1 MPa and an elongation at break of not less than 1%.

6. The wiper blade rubber according to claim 5, wherein a volume ratio of the solid lubricant to the binder in the coating layer is in a range of from 0.25 to 1.

7. The wiper blade rubber according to claim 1, wherein the portion (A) has a thickness of 2 μm to 10 μm.

* * * * *